(12) United States Patent
Hammon et al.

(10) Patent No.: US 11,362,813 B2
(45) Date of Patent: Jun. 14, 2022

(54) CRYPTOGRAPHIC SYSTEMS AND METHODS FOR EXTENDING APPARENT SIZE OF POOLS OF TRULY RANDOM NUMBERS

(71) Applicant: 7Tunnels, Inc., Park City, UT (US)

(72) Inventors: Michael L. Hammon, Ames, IA (US); Wesley A. Hildebrandt, Sussex, WI (US); Kevin R. McCarthy, Park City, UT (US)

(73) Assignee: 7Tunnels Inc., Park City, UT (US)

( * ) Notice: Subject to any disclaimer, the term of this patent is extended or adjusted under 35 U.S.C. 154(b) by 0 days.

(21) Appl. No.: 16/637,806

(22) PCT Filed: Aug. 24, 2018

(86) PCT No.: PCT/US2018/048010
§ 371 (c)(1),
(2) Date: Feb. 10, 2020

(87) PCT Pub. No.: WO2019/040909
PCT Pub. Date: Feb. 28, 2019

(65) Prior Publication Data
US 2021/0218553 A1 Jul. 15, 2021

Related U.S. Application Data

(60) Provisional application No. 62/550,068, filed on Aug. 25, 2017.

(51) Int. Cl.
*H04L 9/12* (2006.01)
*H04L 9/06* (2006.01)
*H04L 9/16* (2006.01)

(52) U.S. Cl.
CPC .......... *H04L 9/0662* (2013.01); *H04L 9/0618* (2013.01); *H04L 9/12* (2013.01); *H04L 9/16* (2013.01)

(58) Field of Classification Search
USPC .......... 380/46, 255, 264, 276; 726/2, 21, 36; 713/150, 163, 181
See application file for complete search history.

(56) References Cited

U.S. PATENT DOCUMENTS 10,003,457 B2  6/2018  Hammon et al.
2014/0331050 A1* 11/2014 Armstrong ............ H04L 9/0819
                                                              713/171

(Continued)

FOREIGN PATENT DOCUMENTS

WO   WO 2019/040909 A1   2/2019

OTHER PUBLICATIONS

Portmann Christopher: "Key Recycling in Authentication", IEEE Transactions on Information Theory, IEEE Press, USA, vol. 60, No. 7, Jul. 1, 2014 (Jul. 1, 2014), pp. 4383-4396, XP011550433, ISSN: 0018-9448, DOI: 10.1109/TIT.2014.2317312.

(Continued)

*Primary Examiner* — Sharif E Ullah
(74) *Attorney, Agent, or Firm* — Phillips Winchester

(57) ABSTRACT

A first copy of a True Random Number (TRN) pool comprising key data of truly random numbers in a pool of files may be stored on a sender and a second copy of the TRN pool is stored on a receiver. An apparent size of the TRN pool on each device is expanded using a randomizing process for selecting and re-using the key data from the files to produce transmit key data from the first copy and receive key data from the second copy.

20 Claims, 6 Drawing Sheets

(56) References Cited

U.S. PATENT DOCUMENTS

| | | | |
|---|---|---|---|
| 2016/0012252 A1* | 1/2016 | Deleeuw | G09C 1/00 |
| | | | 726/26 |
| 2016/0315763 A1* | 10/2016 | Hammon | H04L 9/0656 |
| 2017/0237558 A1* | 8/2017 | Yuan | H04L 9/12 |
| | | | 380/279 |
| 2019/0182034 A1* | 6/2019 | McCarthy | H04L 9/0662 |
| 2020/0336301 A1* | 10/2020 | Mccarthy | H04L 9/3226 |
| 2020/0336304 A1* | 10/2020 | Hammon | H04L 9/0662 |

OTHER PUBLICATIONS

PCT Application No. PCT/US2018/048010, International Search Report and Written Opinion dated Nov. 1, 2018, 7 p.

* cited by examiner

CRYPTOGRAPHIC SYSTEMS AND METHODS FOR EXTENDING APPARENT SIZE OF POOLS OF TRULY RANDOM NUMBERS

CROSS-REFERENCE TO RELATED APPLICATIONS

This application is a national phase entry under 35 U.S.C. § 371 of International Patent Application PCT/US2018/048010, filed Aug. 24, 2018, designating the United States of America and published in English as International Patent Publication WO 2019/040909 A1 on Feb. 28, 2019, which claims the benefit of the filing date under Article 8 of the Patent Cooperation Treaty of U.S. Provisional Patent Application Ser. No. 62/550,068, filed Aug. 25, 2017, for "Cryptographic Systems and Methods for Extending Apparent Size of Pools of Truly Random Numbers," the disclosure of each of which is hereby incorporated herein in its entirety by this reference.

TECHNICAL FIELD

Embodiments of the present disclosure relate generally to cryptography and more specifically to encryption and decryption using data and structures similar to one-time pads.

BACKGROUND

Cryptography is important for many types of communications including, but certainly not limited to, communications involving financial data, medical data, and government classified data. Many types of encryption are very difficult to decrypt but can eventually be broken. Other types of encryption have significant vulnerabilities making decryption relatively easy. Conventional one-time pads are generally considered completely secure and unbreakable. However, conventional one-time pads have a drawback related to how to convey the one-time pads to keep them secret. Moreover, for conventional one-time pads, the length of the key is equal to the length of the data to be encrypted, which may be unsuitable for high-bandwidth applications even if secure conveyance of the one-time pad is possible.

DETAILED DESCRIPTION

Figure 1:
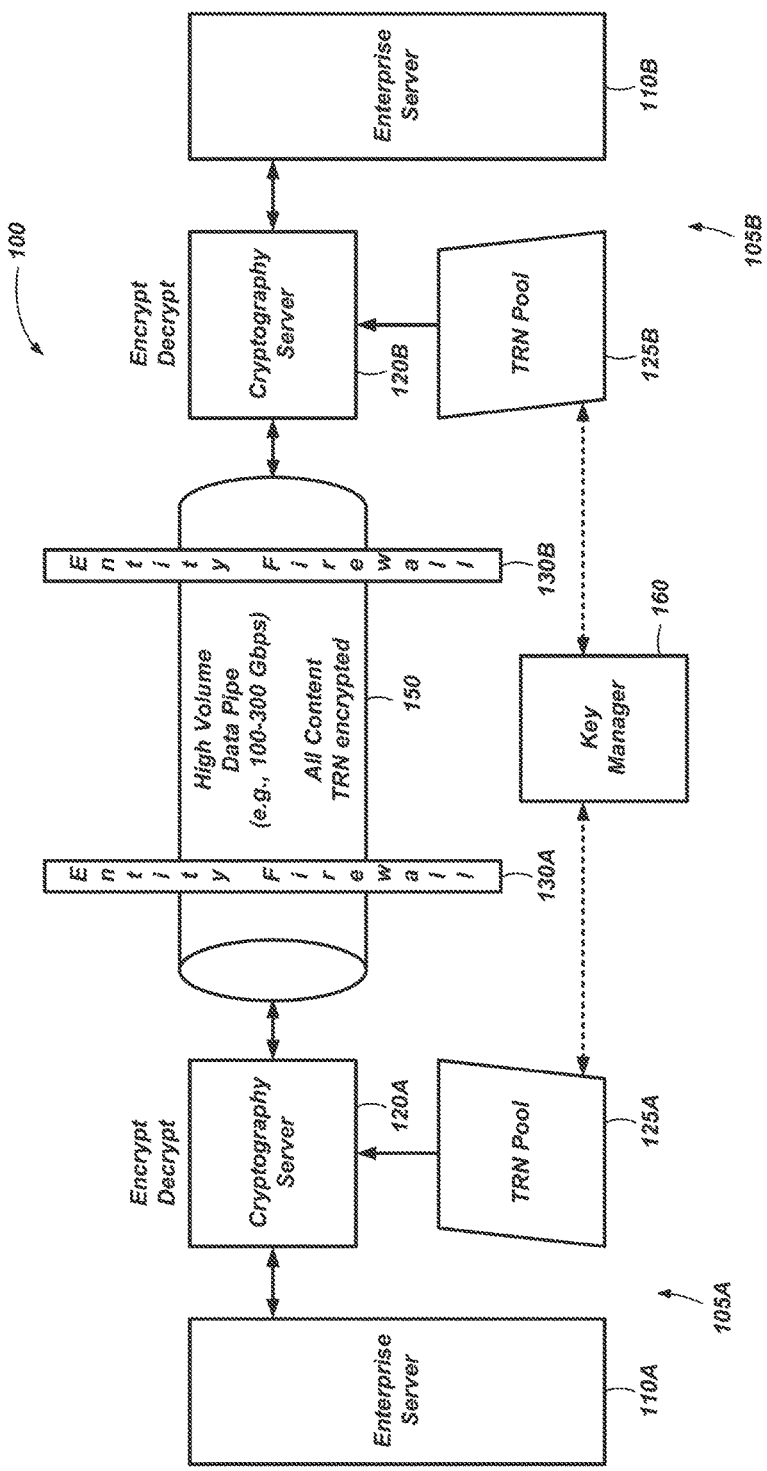
FIG. 1 is a block diagram of an encryption system using True Random Number (TRN) pools with an extended apparent size to accommodate a high-volume data pipe.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g. 110) and specifically indicated for a given instantiation by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Headings may be included herein to aid in locating certain sections of detailed description. These headings should not be considered to limit the scope of the concepts described under any specific heading. Furthermore, concepts described in any specific heading are generally applicable in other sections throughout the entire specification.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

A "module" means a software process, a collection of software processes, a collection of hardware elements, or a combination thereof configured to implement one or more elements of the present disclosure.

Before describing specific embodiments, and in order to facilitate description in the present disclosure, various terms are described herein. Where ambiguity may exist between the plain meaning, dictionary meaning, and the term as described herein, a person of ordinary skill in the art will recognize the term as described herein will best conform to a more comprehensive understanding of embodiments of the present disclosure.

A "one time pad" (OTP) is an unbreakable encryption technique in which identical paired sets of key material are distributed to two communicants prior to their need for encrypted communication. When needed, a portion of the OTP is used by the sending communicant to encrypt a message and the matching portion is used by the receiving communicant to decrypt the message. In early implementations, OTPs were literal pads of paper with random single-letter substitutions, and after portions of one or more pages in the pad were used to encrypt a message the pages could be removed from the pad and destroyed to prevent decryption of the message by anyone other than the recipient with the matching pad.

A "Random Cipher Pad" (RCP) is similar to, but different from, an OTP according to some embodiments of the present disclosure. The term RCP may be used as a generic term for various species of RCPs. An RCP is a collection, which may be a file, of truly random numbers, e.g., gathered from one or more "True Random Number Generators" (TRNGs). The use of the word "random" evokes the protection an OTP offers by alluding to the truly random nature of the cipher. Although the size of the RCPs could vary between instantiations, or perhaps even within a particular instantiation, RCPs in many instances are measured in kilobytes or even larger units.

An "RCP pool" is a collection of RCPs. Each RCP within an RCP pool may be identified by a number that is unique within that pool (e.g., a sequential integer). Globally Unique IDentifiers (GUIDs), each comprising a unique 128-bit number, may be used as identifiers such that careful construction of this number can guarantee global uniqueness within any particular system. Thus, in some embodiments, each RCP pool may be identified with a GUID. Moreover, while a simple sequential identifier may be used to identify each RCP within an RCP pool, a GUID, a hash of the RCP, or other type of unique identifier may be used instead to identify each RCP within an RCP pool.

A "True Random Number Generator" (TRNG) is a hardware device, and associated software if needed, used to generate truly random numbers from an unpredictable quantum or non-quantum physical process. Quantum examples of these processes include nuclear decay, photons transmitted through a partially transparent mirror, and fluctuations in vacuum energy. Non-quantum examples include thermal noise, clock drift, and RF noise.

A "True Random Number (TRN) pool" is a set of true random numbers generated by a TRNG hardware device, and associated software if needed. A QRN pool is a species of a generic TRN pool wherein the true random numbers in the pool are generated by a quantum process. The terms "set" and "pool" may be used interchangeably within this description. In other words, this description may use TRN pool and TRN set interchangeably and QRN pool and QRN set interchangeably. In addition, a TRN pool may be configured as a pool of individually selectable and addressable RCPs such as the RCP pool described above.

A "Data RCP" is a species of RCP used to encrypt and decrypt communications between two or more endpoints.

A "Random Cypher Key" (RCK) is a data RCP, a portion of a Data RCP, a combination of two or more data RCPs, or a combination of portions of two or more Data RCPs such that the RCK has a length corresponding to a length of a message that is to be operated on by the RCK.

A "Key RCP" is a species of an RCP used to encrypt and decrypt a Data RCP to securely transfer it electronically. Each Key RCP is only used once.

"Mapping" is a process of converting a Data RCP, once used, into a Key RCP for secure transfer of a subsequent Data RCP.

A "mapping index" is a list of numbers that includes the integers from one through the number of units (e.g., bytes, words, etc.) in a Data RCP in random order. The mapping index may be encrypted and sent to the appropriate endpoints of a particular communication channel and may be used as part of the process to convert Data RCPs into Key RCPs.

The terms "unencrypted," "unencrypted data," "unencrypted data structure," "unencrypted message," "clear text," and "plain text" refer to data that is not encrypted.

The terms "encrypted," "encrypted data," "encrypted data structure," "encrypted message," and "cipher text" refer to data that has passed through an encryption process according to embodiments of the present disclosure. As a non-limiting example, encrypted data may be generated by performing a bitwise exclusive-OR between a plain text message and a random number from a TRN pool.

The terms "decrypted," "decrypted data," "decrypted data structure," and "decrypted message" refer to data that was previously encrypted and has been returned to its original value. As a non-limiting example, decrypted data may be generated by performing a bitwise exclusive-OR between an encrypted message and the same random number from a TRN pool that was used to encrypt the plain text message. Decrypted data may also be referred to as "clear text," or "plain text." Thus, plain text and clear text may refer to data before encryption or data after decryption.

The term "commutative" refers to a characteristic of the application of multiple RCPs in a manner that the order in which data is encrypted using multiple RCPs does not matter. In other words, as long as the same set of RCPs is used to encrypt and decrypt, using the RCPs in different orders for encryption and decryption will produce the same final result.

The term "pad" may be generically used herein to refer to an RCP according to embodiments of the present disclosure. In contrast, a conventional one-time pad is explicitly referred to as a conventional one-time pad or a one-time pad and not simply as a pad.

Implementation Overview

Embodiments described herein facilitate utilization of Random Cipher Pads (RCPs), which may be somewhat similar to conventional one-time pads, but used in new and different ways. The RCPs are used not only to encrypt information (for example, documents, media streams, and data files), but also to encrypt subsequent RCPs that in turn can be used by the original users recursively. Moreover, embodiments of the present disclosure include processes to extend the apparent size of a pool of RCPs, which may be particularly useful in high-bandwidth applications.

Conventional one-time pad encryption is generally recognized as being unbreakable. Similarly, the use of RCPs is unbreakable under the condition that (1) the RCPs are securely distributed to the communication endpoints, or (2) the Mapping process converting Data RCPs to Key RCPs is secure and unbreakable. Therefore, an endless number of RCPs can be securely used by the communicants as long as the party generating the RCPs continues to send subsequent RCPs encrypted by the preceding RCPs and the used RCPs are rendered undiscoverable, unusable, unreadable, otherwise inaccessible, or destroyed.

Interception of the transmission generally will not help an intruder since RCP encryption cannot be broken. At worst, the intended recipient will not receive the transmission intended for him and will contact the sender, uncovering a theft or loss of information.

In some embodiments, the initial RCP exchange installation is done "outside" the electronic environment, or done in a highly secure manner with full authentication of Sender and Recipient. This results in a situation where each subsequent RCP cannot be decrypted and therefore cannot be intercepted for use.

Conventional one-time pads are currently not practical for ubiquitous use, or even enterprise use, because each pad is a singular event and the sender and recipient(s) must have an identical pad for each transmission. Identical pads are requisite for encryption and decryption. Heretofore, conventional one-time pads between sender and receiver were exchanged using Public Key Encryption (PKE), which is breakable. The use of PKE to "secure" exchange of pads is not secure, and increasingly vulnerable. Delivering a new pad manually (e.g., by mail or courier) for each new use may be impractical, costly, and inefficient; plus, the method of getting each successive pad into one or more recipients' hands may create vulnerabilities. In situations where replenishment is impractical or limited, the existing RCP may be expanded or extended according to embodiments of the present disclosure.

The following aspects, presented in separate or cumulative embodiments, present functionality opportunities possible with RCP encryption methods or processes. In general, an RCP may be used for data encryption and separately used for encrypting features of the encryption process itself. In other words:

1. The original RCP can be used to encrypt for electronic transmission a new, uncorrelated RCP that is also unbreakable.
2. The new uncorrelated RCP is encrypted using an RCP that came before it, meaning that the new RCP cannot be decrypted or used even if intercepted.
3. Multiple new RCPs can be generated and transmitted (along with the documents or information they encrypt or separately) by the original user(s).

Stated another way, embodiments of the present disclosure include apparatuses and methods for providing cryptographic procedures including remapping a current RCP into an uncorrelated random variable used for securely passing a replacement RCP. These embodiments are configured to reduce and/or eliminate attack surfaces. This recursive process implies that an initial RCP and mapping data may be installed in conjunction with original software installation as part of an end-point registration process. The initial RCP and mapping data may be configured such that they include matching data on a server or other device. In order to insure the integrity of the system, an initial install including the initial RCP should be completed using high security protocols.

In some embodiments, some or all of the encryption features described herein are implemented within a computer processor or processing device that executes the encryption procedures. The transformation of data that occurs according to the specific encryption techniques described herein render the processing device executing embodiments described herein as a special-purpose processing device capable of new functionality that is otherwise not available executing conventional software or logical procedures. Furthermore, efficient processing of such encryption procedures requires implementation within computer processing systems. Furthermore, the interactions between an electronic storage device to store data associated with the encryption techniques described herein and the computer processing devices to execute the encryption techniques described herein achieve much greater efficacy than would be possible through other non-computerized means.

It is a characteristic of RCP encryption that if an exclusive-OR (XOR) operation is used to encrypt the data then applying the exclusive XOR a second time (with the same RCP data) will decrypt the data. Therefore, the encryption and decryption processes are similar. However, encryption and decryption are not restricted to the use of XOR as the encryption operator for the RCP encoder and decoder. Any suitable symmetric operation could be used.

In some embodiments, RCP generation takes place on the computer that has the greatest resources, either on the sender's computer or on the recipient's computer. Alternatively, the RCP generation may be performed by a third-party intermediary computer or reference computer (e.g., an RCP server) and delivered in a secure fashion to each of the computers wishing to communicate with each other over a secure channel.

RCP sizes may vary in different implementations, or even over different stages of the same communications stream between sender and receiver devices.

For ease of description, data elements are generally described in terms of "bytes." However, a person of ordinary skill in the art will recognize that the data elements may be configured in many sizes suitable to different applications, such as, for example, "16, 32, or 64 bit words.

Implementation Details

FIG. 1 is a block diagram of a cryptography system 100 using synchronized TRN pools (125A, 125B) with an extended apparent size to accommodate a high-volume data pipe 150. Many large Business-To-Business and Enterprise Campus-To-Campus data operations are utilizing the highest possible throughput fiber/cable connection options currently available. These bandwidths may be in the range of 100-300 Gbits/second. These High-Volume Data Pipes (HVDP) enable efficient, ultra-high-speed data exchange between distributed locations at near real-time speed. The HVDPs 150 may be leased at high dollar rates and handle some of the most proprietary data a corporation might possess. HVDPs 150 also present a broad targeting opportunity for hackers and criminal activity. Embodiments of the present disclosure include encryption solutions to autonomously and seamlessly encrypt all data while under corporate control within the firewall, and then decrypt the data within the firewall at the other end moving data back onto an enterprise server 110 for distribution.

In FIG. 1, a cryptography server (120A, 120B) is located within an entity firewall (130A, 130B), such as, for example, a corporate firewall at each end of the HVDP 150. Elements numbers in FIGS. 1 and 2 include an appended "A" or "B" to indicate similar blocks, modules, and functions on each side of a communication system. Thus, drawing elements may be referred to with their generic number without the appended "A" or "B" when describing functions that are similar on each end. Encryption takes place on the cryptography server 120 as one of the last operations when data leaves a sending device 105A before entering the HVDP 150. Conversely, decryption talks place on the cryptography server 120 as one of the first operations when data exits the HVDP 150 at a receiving device 105B. The cryptography server 120 couples to the enterprise server 110, which collects plain text traffic to be encrypted on the sending device 105A or distributes plain text traffic to the designated recipient(s) after decryption on the receiving device 105B. Each cryptography server 120 is also connected to separate data storage which contains a large True Random Number Pool (TRNP) (125A, 125B). With embodiments of the present disclosure these TRNPs 125 on each side are identical and can be synchronized to provide True Random Numbers (TRNs) used as encryption keys and decryption keys. The TRNPs may be replenished on a routine basis by an out-of-band key manager 160 supplied from a remote system and installed by the client's IT administrator. Various high security features are built into this system to prevent compromise on control or replenishment of the TRNPs 125.

In some embodiments, the cryptography server 120 and the enterprise server 110 may be different physical servers. In other embodiments, the cryptography server 120 and the enterprise server 110 may be configured as separate processes in communication with each other on a single physical hardware device.

Embodiments of the present disclosure extend the effective size of a given pool of key material being used for the 1) symmetric encryption/decryption (also referred to herein as symmetric cryptography) of user data or 2) symmetric cryptography of random data produced for dynamic replacement of key data used for symmetric cryptography of user data. Details of this symmetric cryptography for user data and dynamic replacement of key data may be found in U.S. patent application Ser. No. 15/134,260, filed Apr. 20, 2016, issued as U.S. Pat. No. 10,003,457 on Jun. 19, 2018, and entitled "Random Cipher Pad Cryptography," the entire disclosure of which is hereby incorporated by reference in its entirety.

In extending the effective size of a given pool of key material, random bytes of key material are re-used. As a result, embodiment of the present disclosure may not reach the security of a one-time pad where bytes are never re-used. However, such embodiments can be more secure than Private Key Infrastructure (PKI) encryption methods and can also be Quantum Proof.

Figure 2:
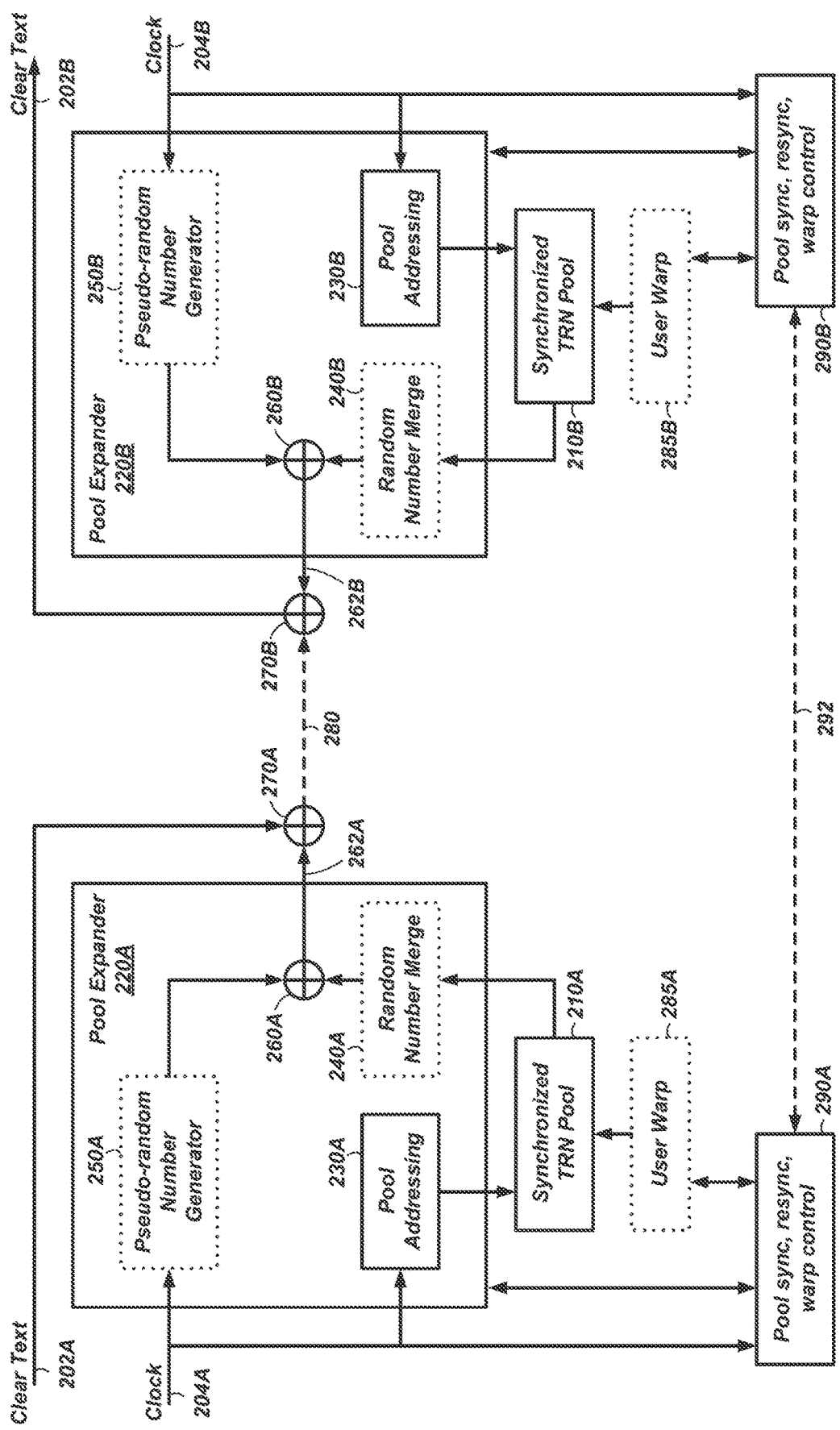
FIG. 2 is a more detailed block diagram illustrating elements on a cryptography server using a TRN pool.

FIG. 2 is a more detailed block diagram illustrating elements on the cryptography servers 120 using TRN pools (210A and 210B). In general, each cryptography server 120 operates the same except that one side is encrypting clear text data elements 202A as an input to an encryption operation 270A (e.g., a bitwise XOR) to create encrypted data elements 280 and the other side is decrypting the encrypted data elements 280 using a decryption operation 270B (e.g., a bitwise XOR) to create clear text data elements 202B as an output. Of course, communication is two-way and although encryption and transmission is shown from A to B (left to right) in FIG. 2, encryption and transmission will generally flow both directions.

A first copy 210A and a second copy 210B of the synchronized TRN pools (210A and 210B) are identical and a pool sync/resync module 290 is included to ensure that the same key material elements within the synchronized TRN pool 210 are selected and used at the same time on each side.

Embodiments of the present disclosure may extend the effective size of a given TRN pool 210 being used for symmetric cryptography by providing a pool expander (220A and 220B) that defines a substantially random method of using the truly random numbers (also referred to herein as key material elements) in the TRN pools 210 multiple times before they are retired from use. The synchronized TRN pools 210 would be delivered to each side in a secure manner, such as, for example, by trusted courier, tamper evident packaging, or other suitable secure communication channel.

The pool expander 220 provides one or more randomizing processes for selecting key material elements from the synchronized TRN pool 210, which, in some embodiments, may be in a substantially random manner, but also reproduceable, such that the sending device 105A and the receiving device 105B can stay in synchronization to select and/or modify the same key data elements from the TRN pools 210. Within the pool expander 220, blocks shown with dotted lines may be included or left out in the pool expanders 220 in various embodiments of the present disclosure.

A pool addressing module 230 may be configured to address one or more individual key material elements within the synchronized TRN pool 210. Further details on the pool addressing module 230 and its function in various embodiments are provided below in the description of FIGS. 3 through 5.

A pseudo-random number generator 250 may be included to implement a pseudo-random number generation process to create pseudo random numbers to be combined with one or more key material elements from the synchronized TRN pool 210 at XOR 260. The pseudo-random number generator 250 is configured such that it produces random numbers as it progresses through its states, but with a pre-defined sequence. In other words, the pool sync/resync modules 290 on each side can use initialization parameters to set the pseudo-random number generator 250 on each side to a same initial state. From then on, as long as the pseudo-random number generators 250 on each side stay in synchronization, each subsequent state will produce the same pseudo-random number on each side. An output from the pseudo-random number generator 250 is combined with the output of the synchronized TRN pool 210 (or random number merge module 240) at XOR 260 to produce a truly random number result 262 that has been modified by the pseudo-random number. Further details on the pseudo-random number generator 250 and its function in various embodiments are provided below in the description of FIG. 5.

A clock 204 may be used to ensure that the pool addressing module 230 and the pseudo-random number generator 250 stay in synchronization and provide timing for the pool sync/resync module 290 to synchronize, initialize, or resynchronize the pool addressing module 230 and pseudo-random number generator 250 as needed.

In some embodiments, a random number merge module 240 may be included to merge multiple key data elements from the synchronized TRN pool 210 into a single key element for encryption. Further details on the random number merge module 240 and its function in various embodiments are provided below in the description of FIGS. 3 and 4.

Thus, in the sending device 105A final key data elements 262A are used in an encryption operation 270A (e.g., a bit-wise XOR) of the original clear text elements 202A to produce encrypted data elements 280, which are transmitted to the receiving device 105B. At the receiving device 105B, receive key data elements 262B are produced from the pool expander 220B. When the same TRN pool 210 is used on each side, the same randomizing process is used on each side, and the randomizing processes are synchronized, the receive key data elements 262B will match the final key data elements 262A. As a result, the decryption operation 270B (e.g., a bit-wise XOR) combining the encrypted data elements 280 with the receive key data elements 262B will produce received clear text elements 202B that match the original clear text elements 202A.

A warping module 285 may be included in some embodiments of the present disclosure. There may be cases where an unauthorized internal or external actor is able to obtain a copy of Random Cipher Pads (RCP) or the TRN pool 210 by some means or able to otherwise ascertain contents of the TRN pool 210. There may be other cases where the client desires to modify the TRN pools 210 after the TRN pools 210 have been provided by a supplier of the TRN pools 210 (e.g., in case data of the supplier is compromised or is otherwise ascertained by third parties). Some embodiments of the present disclosure enable a process for performing a user-specific modification of the TRN pool 210 (also referred to herein as warping or performing a warp operation). Once the warp has been implemented, only the client users will be able to decrypt any traffic. At that point, the TRN provider has irrevocably turned total and complete control of the key data elements in the TRN pool 210 over to the client. Examples of such a warping proceeding are disclosed in, for example, U.S. Provisional Patent Application Ser. No. 62/617,984, filed Jan. 16, 2018, the disclosure of which is hereby incorporated herein in its entirety by this reference.

This warping operation includes a multi-party process whereby one, two, or more individuals have the ability in coordination with each other to warp the TRN pool 210 in such a manner that both end point TRN pools 210 remain exactly synced after the process.

As a non-limiting example, it could be described as a well-defined reversible or irreversible process that maps an input TRN pool 210 into an output warped TRN pool 210 of similar size. In order to keep the process somewhat simplified for operators in the field, portions of the warp process may be initiated or pre-installed in advance under a controlled environment. Later, as the operational end-point is in actual service under field conditions, designated manager(s) may have the ability to input a less complex warp code that precisely matches one being input in coordination with the other end-point. As long as each end-point manager has sufficient access and the same input codes, and agreed input timing, the TRN pool 210 on each end could be warped as often as desired. If needed, additional input codes could be exchanged offline through any number of communication links or through masked references to mutually known sequences or combinations.

As another possibility, for less vulnerable or less sensitive corporate use-cases, the main TRN pool 210 maintained at home base or headquarters could be completely warped upon receipt from the TRN provider and before portions are delegated to each deployed end-point. This would eliminate any possibly of the TRN provider ever being able to exploit traffic, leaving all vulnerability in the client's hands.

A warping module 285 may be included such that the warping could be accomplished using a variety of means for modifying the key data elements in the TRN pool 210.

As non-limiting examples, key derivation functions such as creating a hash from a secret password or secret passphrase may be used on the sending device 105A such that the hash is combined with the TRN pool 210 to create new key data elements in the TRN pool 210 that would be unknown and undiscoverable by the TRN provider. Only those with the secret password or secret passphrase and knowledge of the key derivation function would be able to modify another TRN pool 210 in the same manner such that it could be used for decryption purposes on a receiving device 105B. Moreover, the key derivation function may be modified by providing non-secret salting parameters, secret peppering parameters, or combinations thereof when creating the hash.

Figure 3:
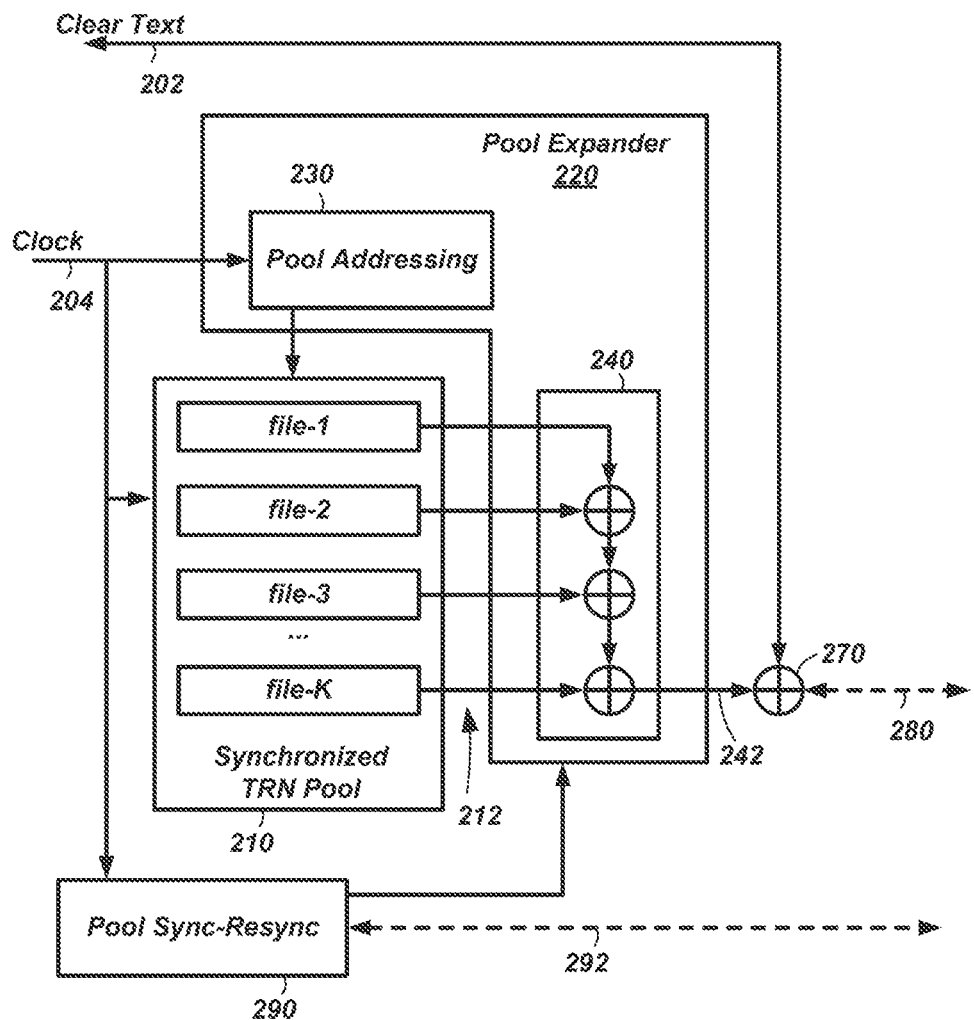
FIG. 3 is a block diagram illustrating a pool expander for merging random number key information from various locations in the TRN pool.

FIG. 3 is a block diagram illustrating the pool expander 220 for merging random number key information from various locations in the synchronized TRN pool 210.

Recall that embodiments of the present disclosure can encrypt: 1) user data as well as 2) random data produced for dynamic replacement of key data that can later be used for symmetric cryptography of user data.

With respect to the user data encryption, the synchronized TRN pool 210 may be configured as a static TRN pool 210 consisting of "N" files (e.g., RCPs), each containing "M" random bytes each for a total of N×M bytes in the TRN pool 210.

If these bytes in the TRN pool 210 were used as one-time pads at 100 Mbits/s they would last $N*M*8/2^{20}/86,400$ days (assuming 24/7 operation). Embodiments of the present disclosure use the pool expander 220 to substantially increase the usability of a given TRN pool 210 by extending the apparent size of the TRN pool 210 with various pool-reuse processes.

These pool-reuse processes are configured to permute the TRN contents of each of the two or more individually addressable files in a manner that is reproducible on each side (i.e., sending and receiving) of the cryptographic process. Many different permutation processes may be used as long as each side has initialization parameters to define the permutation process, which files to use, and where to start the permutation process so they can stay in synchronization in the permutation process. As non-limiting examples, looping processes using prime numbers and coprime numbers to create addressing permutations are discussed.

As a general example of these looping processes, first look at the use of start/step values in extending the effective length of a single string of random bytes. For example, assume there are "N" bytes of random data in an array "R". If an address pointer is set to 0 and increments with a step size of 1 it will produce the original string of random data. Now you want to extend the length of the random data but don't have the means of generating additional data, and "looping" the address pointer (repeating the same sequence) is generally not acceptable. One way to extend the length of the random data is to add an integer "step size" to the mix.

Now we set the address pointer to 0 and the step size to do various looping algorithms to permute the elements in the array.

As one example, consider a location description comprising "K" random files, "K" starting addresses (one for each of the "K" random files) and "K" step sizes (one for each of the "K" random files) chosen by the sending system. This location description is also referred to herein as TRNP addressing information and initialization parameters. This TRNP addressing information may be sent to the recipient system as information within a header. For "M" random bytes of date, bit lengths for the starting addresses and step sizes are ceil(log 2(M)) and "N" files the bit length for the file-id is ceil(log 2(N)). Therefore, the TRNP addressing information contained within a header would be at least 2*ceil(log 2(N))+ceil(log 2(K)) bits long.

The TRNP addressing information may be sent encrypted from the sending system to the recipient system several blocks before it is used so that the recipient is ready to use the new addressing arrangement at the appropriate time. In other words, the TRNP addressing information also includes information indicating a predefined upcoming moment (i.e., a point in the cryptographic procedure) when both the sending system and the receiving system can switch to using the new TRNP addressing information. This TRNP addressing information is used until it is replaced by a new TRNP addressing information block. When the sending system decides to stop using a given TRNP addressing arrangement, a record is made of the TRNP addressing information block including the last used files, file addresses, and file step sizes for that TRNP addressing arrangement. This record enables a fast recovery in the event that the sending system decides to return to the saved TRNP addressing arrangement.

In FIG. 3, the synchronized TRN pool 210 includes N files and any given TRNP addressing arrangement will randomly select K files shown as file-1, file-2, file-3, . . . file-K. The pool addressing module 230 uses each of the K-current addresses as a "starting address" and increments a "step size" within each of the K files to produce K encryption bytes for each byte of user data to be encrypted. Details of stepping processes through the files are described below with reference to FIGS. 4A and 4B.

The contents of the resulting K bytes retrieved from the K file addresses are XORed in the random number merge module 240 to produce the final key data elements used for encryption/decryption at XOR 270.

Using this method, each set of K files can produce multiple TRN sequences by permuting the elements in each file. The combination of permutations of the TRNs in the K files exponentially increases the total length of the TRN stream of final key data elements available from the K files over the K*M raw TRNs in those files. The precise calculation of the level of expansion depends, among other things, on the method used for permuting the file contents.

Figure 4A:
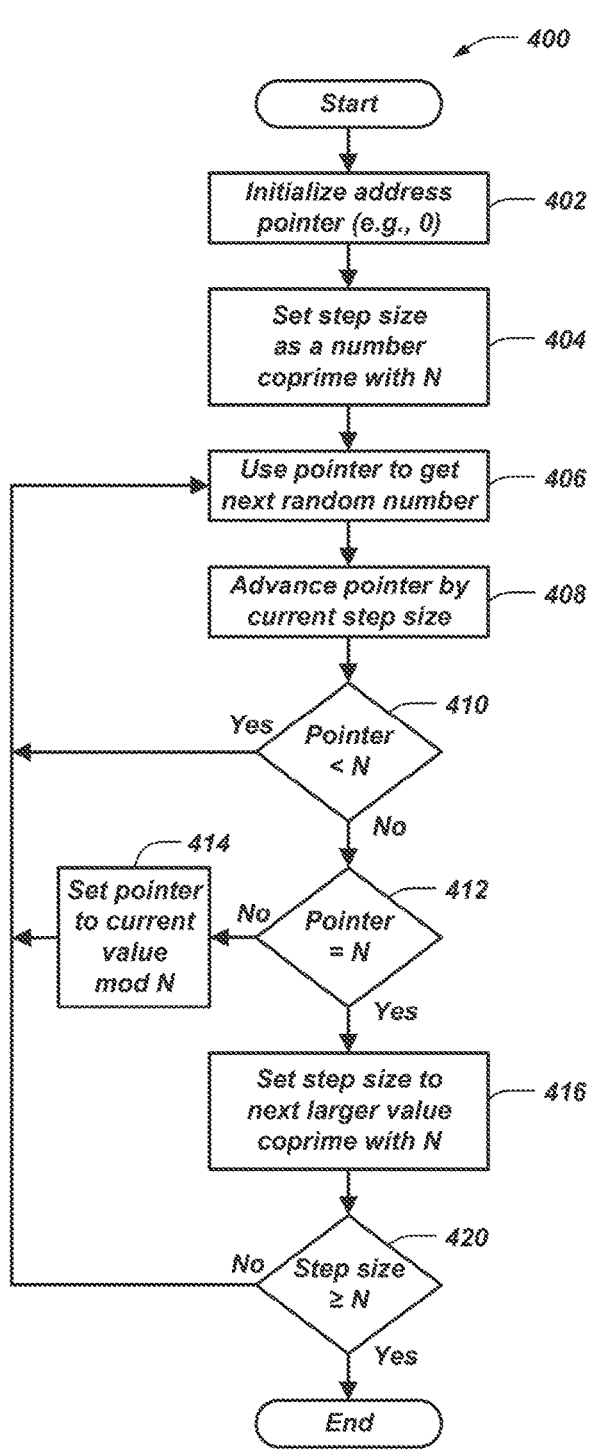
FIGS. 4A and 4B illustrate processes for selecting random numbers from files for the embodiment of FIG. 3.
Figure 4B:
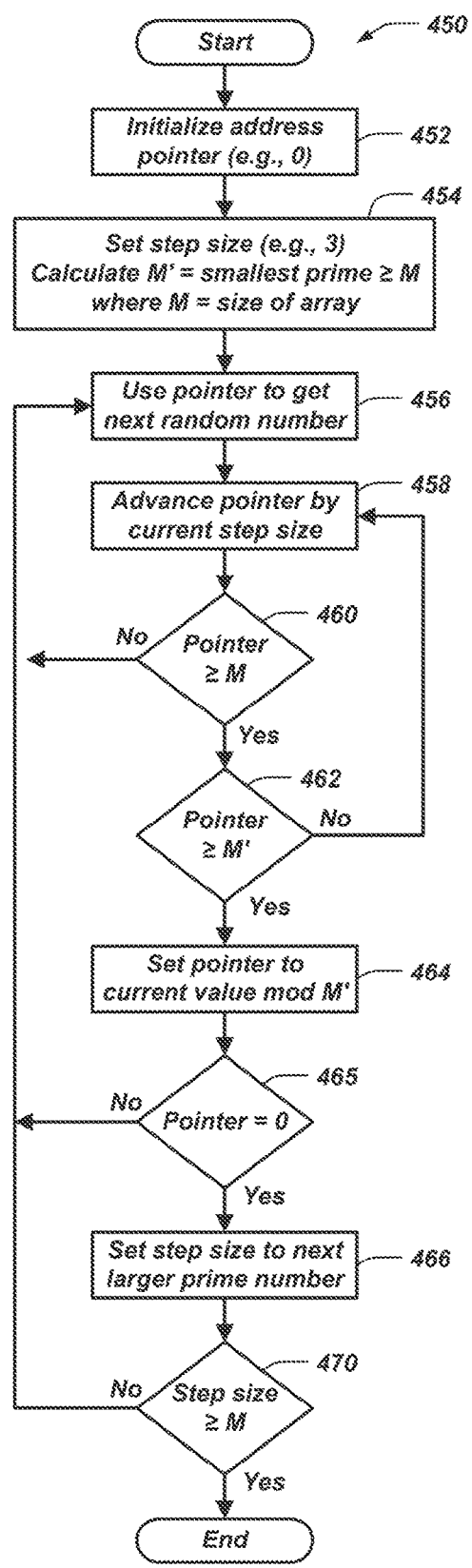

FIGS. 4A and 4B illustrate two example processes of selecting random numbers from files for the embodiment of FIG. 3. Note that these processes would run in K independent processes, one for each file and each of those independent processes would use its own starting address and step size.

Process 400 illustrates one example to permute the TRN contents of each file as illustrated in FIG. 4A. An initial starting index into the file and a step size coprime to N (the file size) are chosen, and then by sequentially adding the step size to the index, modulo N, each location in the file will be visited exactly once before returning to the original starting index to loop through again with a new coprime number.

Another possible process 450 to permute the TRN contents of each file is illustrated in FIG. 4B using prime numbers. An initial starting index into the file and a prime number step size are chosen and the next prime number (M') larger than the size of the file M is identified. Then, by sequentially adding the step size to the index, modulo M', each location in the file will be visited exactly once before returning to the original starting index to loop through again with a new prime number.

Referring to FIG. 4A, addressing process 400 begins at process block 402 where the address pointer is initialized, for example to 0. At process block 404, the step size is initialized to a number that is coprime with N, which is the size of the array. In embodiments that use the starting address and step size defined in the TRNP addressing information blocks discussed above, the address pointer and step size for addressing process 400 would be initialized to those values defined in the addressing information block, rather than the 0 and the initial coprime number defined in process 404. For subsequent passes through process 400 the address pointer and step size would be initialized to 0 and the initial coprime number, respectively. In addition, the process may be stopped at any point and the address pointer and step size stored in the TRNP addressing information block for later use such that the loop can be restored at the point where it left off.

At process block 406, the address pointer is used to get the next random number from the array and output the result. At process block 408, the address pointer is advanced by the current value of the step size.

At process block 410, the new address pointer is tested to see if it is pointing to an element in the array. If so, the process loops back to process block 406 to get the next random number.

If the current address pointer is not pointing to an element in the array, process block 412 tests to see if the address pointer is pointing just beyond the last element of the array (note: that since an array of size N is addressed from 0 to N−1, when the pointer=N, it is actually pointing to one address beyond the last element). A characteristic of this looping process using coprime numbers is that when the address reaches N, each element of the array has been addressed in an inner loop comprising processes 406 through 414. To complete this inner loop, at process 412 if the address pointer is not pointing just beyond the last element of the array, the address pointer points even farther beyond the last element of the array and process block 414 sets the address pointer to its current value mod N (i.e., divide it by N and use the integer remainder) and the inner loop goes back to process 406.

If the address pointer is pointing to the last element of the array, the inner loop is complete and process block 416 sets the step size to the next larger value coprime with N. A table of coprime numbers up to N may be produced at initialization to facilitate this process.

At process block 420, the step size is tested to see if it is larger than the number of elements in the array. If not, the process loops back to process block 406 to get the next random number and repeat the outer loop between process 406 and process 420. If the step size is larger than the number of elements in the array, the process stops. Allowing the process to run past this point without re-initialization would produce a duplicate string.

Referring to FIG. 4B, addressing process 450 begins at process block 452, where the address pointer is initialized, for example to 0. At process block 454, the step size is initialized, for example to 3. There is no danger of sub-loops forming since loop limit (M') is selected to be prime and therefore has no co-primes. In addition, the step size is also selected to be a prime number to avoid harmonic relationships between the various step sizes. If harmonic relationships between steps between step sizes is determined to be acceptable to a specific application then this requirement can be dropped in exchange for a significant increase in apparent pool size. In addition, the next prime number larger than M is identified, where M is the size of the array. This next prime number larger than M is defined as M'.

In embodiments that use the starting address and step size defined in the TRNP addressing information blocks discussed above, the address pointer and step size for addressing process 450 would be initialized to those values defined in the addressing information block, rather than the than 0 and initial prime number defined in process 454. For subsequent passes through process 450 the address pointer and step size would be initialized to 0 and 3, respectively. In addition, the process may be stopped at any point and the address pointer and step size stored in the TRNP addressing information block for later use such that the loop can be restored at the point where it left off.

At process block 456, the address pointer is used to get the next random number from the array and output the result. At process block 458, the address pointer is advanced by the current value of the step size.

At process block 460, the current address pointer is tested to see if it is pointing beyond an element in the array. If not, the process loops back to process block 416 to get the next random number.

If the current address pointer is pointing beyond the elements in the array, process block 462 tests to see if the address pointer is greater than or equal to M'. If not, the process loops back to process 458 to advance the address pointer. This looping (i.e., 458, 460, 462) repeats as long as the address pointer is larger than M, but less than M'. A characteristic of this looping process using prime numbers is that when the address pointer is greater than or equal to M', each element of the array has been addressed in an inner loop defined by process 456 through 462.

Once the address pointer is greater than or equal to M' at process 462, process 464 sets the address pointer to its current value mod M' (i.e., divide it by M' and use the integer remainder). At process block 465, the new pointer value is tested to see if it equals zero. If not, the process loops back to process block 416 to get the next random number.

If the pointer is equal to zero, process block 466 sets the step size to the next larger prime number. A table of prime numbers up to M' may be produced at initialization to facilitate this process.

At process block 470, the step size is tested to see if it is larger than the number of elements in the array. If not, the process loops back to process block 456 to get the next random number and repeat the outer loop between process 456 and process 470. If the step size is larger than the number of elements in the array, the process stops. Allowing the process to run past this point without re-initialization would produce a duplicate string.

Process 450 is explained in more detail below to give an example with actual numbers. First, the smallest prime greater or equal to M is identified (call this M'). Then all prime numbers less than M can be used as step sizes in the following manner. If adding the step size to the current file index causes the new index to be greater or equal to M but less than M', continue to add increments of the step size to the index until it is greater to or equal to M', and then subtract M' to result in the new file index. This variation to the prior use of coprime step sizes allows for approximate calculation of the increase factor in total TRN stream length, since there are approximately x/ln(x) prime numbers less than x. This approximation will therefore be used in below calculations, even though this is only one method of permuting the file contents.

As a non-limiting example to show how this process would work, consider a small 15-element array (M=15), with addresses 0 through 14, M'=the smallest prime equal or greater than M, M'=17 in the current case. The primes that would be selected step sizes (S) at process blocks 454 and 456 are; 3, 5, 7, 11 and 13. The rules are; p=(p+S) mod M', if the resulting p>=M then continue adding S as needed until p>=M'. Thus, the process would loop through the addresses of the array as follows:

Step size 3—0 3 6 9 12 1 4 7 10 13 2 5 8 11 14 (back to 0)
Step size 5—0 5 10 3 8 13 1 6 11 4 9 14 2 7 12 (back to 0)
Step size 7—0 7 14 4 11 1 8 5 12 2 9 6 13 3 10 (back to 0)
Step size 11—0 11 5 10 4 9 3 14 8 2 13 7 1 12 6 (back to 0)
Step size 13—0 13 9 5 1 14 10 6 2 11 7 3 12 8 4 (back to 0)

As can be seen, the loop for each step size touches every address once and the process extends the available sequence of addresses for the array from 15 to 75 by performing five loops through all the addresses with a different prime number step size each time. This small array is used as an example for ease of description, some embodiments may use arrays/files that are significantly larger.

In one optional method to improve actual or perceived security of the system, as the TRNs from each file are reordered several times (e.g., perhaps 10 times), the current address, and step size would be recorded as a TRNP addressing information block, temporarily retired, and a new TRNP addressing information block randomly selected to take its place. The new TRNP addressing information block would pick up at its recorded files, start addresses, and step values. This changing to a new TRNP addressing information block occurs at the same time on both the sending system and the recipient system. Timing for the change may be sent as header information, or other suitable method, from the pool sync/resync module 290 on the sending system to the pool sync/resync module 290 on the recipient system.

Thus, using this key merging method, yields roughly $(N*(M^2))/(K*\ln(M))$ bytes of key data for all N files. This means the utility of a 1 TB TRN pool 210 of key data is increased by some $M/(K*\ln(M))$ times.

To make the mathematical description easier to understand, an example of a static TRN pool 210 consisting of 1M files, each containing 1 MB of random bytes each for a total of 1M×1 Mbytes (i.e., 1 TByte). With this example of 1M files of 1 MByte each, assuming 100 Mbits/s the 1M files of 1 MByte each the TRN pool 210 would last 1 day (24/7) without any pool-reuse.

In this example, TRNP addressing information blocks are defined using 5 files of 1 Mbyte each. With five files, five bytes of random data (one from each of the 5 files) are XORed in the random number merge module 240 to produce the final key data element to be XORed with the clear text data element 202.

For example, the transmitting side defines five random files (e.g., five randomly selected files), five starting addresses within each corresponding file and five step sizes for each corresponding file and sends this information to the receiving side as addressing information within a header. In this example of 1 Mbyte files, the addressing information would be 300 bits long because it would include 60 bits of information (30 bits for start address and 30 bits of step size) for each of the five files.

Using this example, each set of five files can produce a sequence of 82.3 GB before it recycles (this takes care not to use non-prime step sizes). This sequence is roughly 16.4 PB for all 1M files. This means the utility of the 1 TB of key data is increased by some 17,262 times.

With respect to encryption for dynamic replacement of key data that can later be used for symmetric cryptography of user data, the process would be the same as for the above process except the encrypted data is the pad rather than the user data. In all cases, the key data along with several sets of initial TRNG pools would be delivered in a secure manner, such as, for example, by trusted courier or tamper evident packaging.

These looping procedures (400, 450) fold the data into a ring and then step around the ring with coprime numbers of N or prime numbers<M'. Therefore, every time around the outer loop produces a different sequence of random numbers. While each sequence is itself random, there is a deterministic relationship between the sequences.

However, encrypting with a second (or more) pad(s) would handle the problem provided that all pads are independent (which is what this system provides, since all pads are generated by a TRNG). In the case of XORing independent sets of random data if two is good then more is better. This stems from the fact that when XORing a pair of independent random variables, the result has equal or greater entropy than the highest entropy of the pair and the average distribution is flatter.

This need for removing and/or reducing the deterministic relationship between the sequences is the reason that multiple files (i.e., K files) are randomly selected to each independently go through the single loop process to generate their own key byte. This process of performing multiple versions of the single loop process is referred to as a multi-loop process. As stated above, the key bytes from each of the K files are then combined in the random number merge module 240 to produce a single key byte for encryption of the clear text 202.

As stated earlier, the header of previous blocks of sent data may include a TRNP addressing information block with pointers to the files, a pointer to the starting-address and an integer containing the step-size for each of the loops for the next block. This prior communication of the TRNP addressing information block is needed because the information required to decrypt each block of data can't be in the same block, the recipient needs to already have it. The data required to decrypt the first block is stored in the tamper evident packaging that was delivered by trusted courier.

The sending system decides when to switch to a different TRNP addressing information block. When the amount of data used exceeds a fixed multiple (e.g., 10) of the file size, the switch may be triggered. When a TRNP addressing information block is swapped its next available address and step size is recorded for when it's called back into service. When the TRNP addressing information block has wrapped back to its starting point it is no longer viable and is deleted. For a 1 MB file with a swap threshold of 10 the expected viable life is 75.6 GB and when chosen would remain in use for 10 MB before being swapped out. It would expect to be swapped around 7,500 times.

The reason for all this swapping is to avoid giving an eavesdropper a chance to obtain any kind of information about the internal processes even if the eavesdropper has a sample clear text.

Figure 5:
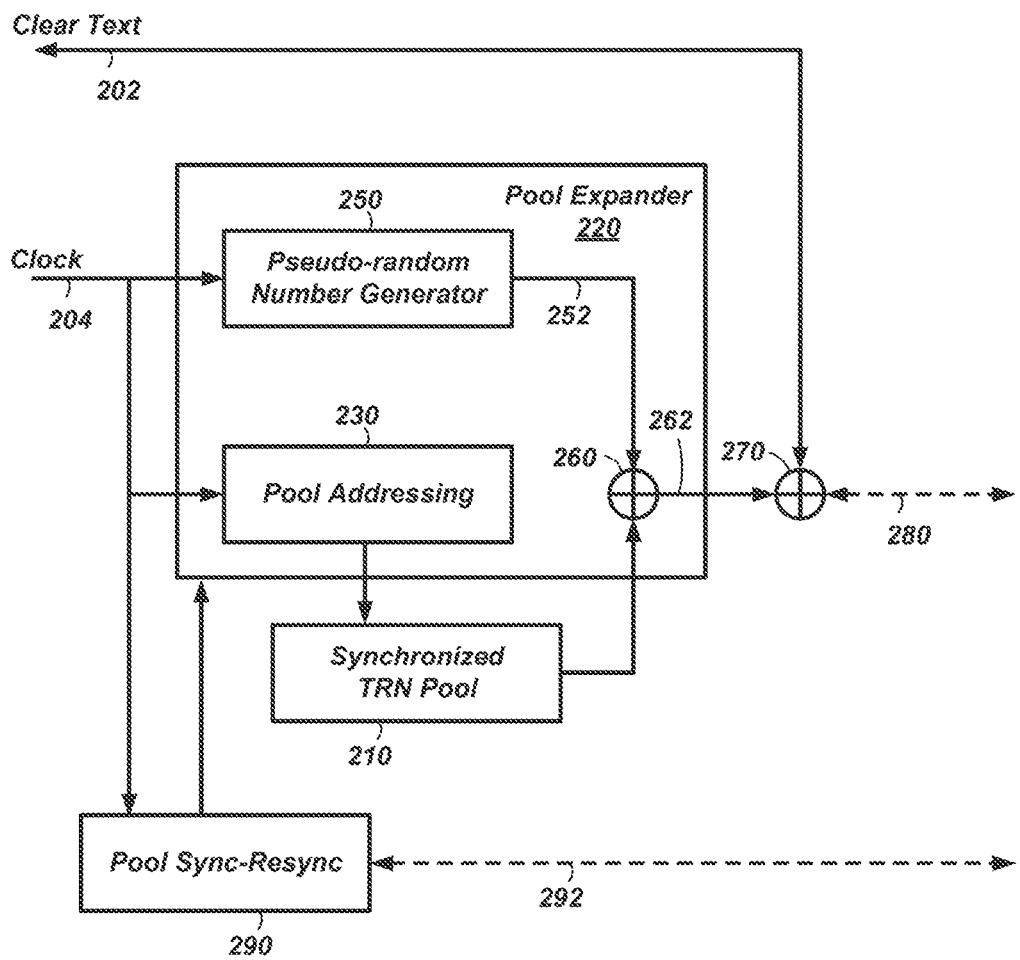
FIG. 5 is a block diagram illustrating a pool expander including a process for combining generated pseudorandom numbers with random number key information from the TRN pool.

FIG. 5 is a block diagram illustrating a pool expander 220 including a process for combining generated pseudorandom numbers with random number key information from the synchronized TRN pool 210. Using this process, the apparent size of a large fixed set of TRNG generated random numbers can be extended, such as, for example, to say $2^{36}$, 64 G, the equivalent of a current large thumb drive.

In some embodiments, the pseudo-random number generator 250 may be configured as an XOR shift with parameters selected to give a predefined length, such as, for example, $2^{64}$ and high quality random distribution (e.g., better than a Mersenne Twister). The XOR shift is a type of linear feedback shift register that produces good results with very fast processing.

Other pseudo-random number generators 250 may be used with varying effectiveness as long as they produce random numbers as they progress through their states, but with a pre-defined result. In other words, the pool sync/resync modules 290 on each side can use initialization parameters to set the pseudo-random number generator 250 on each side to a same initial state such that they will produce the same random number at each state transition.

As stated earlier the clock 204 may be used to ensure that the pool addressing module 230 and the pseudo-random number generator 250 stay in synchronization. In other words, at each clock event a pointer into the synchronized TRN pool 210 is advanced and the state of the pseudo-random number generator 250 is advanced to create a new pseudo-random data element 252. The pseudo-random data element 252 is then combined with a key data element from the synchronized TRN pool 210 to generate a combined key data element 262. The combined key data elements 262 can then be used to encrypt the clear text data elements 202 to generate the encrypted data elements 280. The clock may also provide timing for the pool sync/resync module 290 to synchronize, initialize, or resynchronize the pool addressing module 230 and pseudo-random number generator 250 as needed.

In some embodiments, the pool addressing module 230 would use the clock 204 to simply advance the pointer into the fixed synchronized TRN pool 210 in a linear manner and upon reaching the end, set to loop back to the beginning. The clock would also trigger the XOR shift into its next state, and upon reaching the end, quit and provide new parameters to the XOR shift and/or define a new file to use from the synchronized TRN pool 210.

Basically, this process converts an already high-quality pseudo-random number into a true random number by XORing the output of the pseudo-random number generator 250 with the output of the synchronized TRN pool 210.

The seeded values (i.e., initialization parameters) defining the parameters for the pseudo-random number generator 250 may be provided in the delivery of the synchronized TRN pool 210 (e.g., trusted courier, tamper evidence, etc.). In the event of a loss, it may be necessary to get synchronization back. This re-synchronization may require the transfer of state information from the sender to the receiver. Loss of synchronization means the secured channel is down, but an unsecured ethernet channel can be used for communications. As a result, synchronization may be restored through a separate RCP encryption path on the ethernet channel. As one example, a small RCP encryption pad may be included on the sender and receiver to provide information used for recovery.

Returning to the general block diagram of FIG. 2, it can be seen that the embodiments of FIGS. 3 and 5 can be combined such that the resulting key byte to be used for encryption at XOR 270 could be from XOR 260 and XOR 260 could combine the output of the pseudo-random number generator 250 with a key data element from the random number merge module 240. The random number merge module 240 and pool addressing module 230 may operate to provide a key data element by performing a single permutation process through a selected file in the synchronized TRN pool 210 as discussed above with reference to FIG. 4. In other embodiments, the random number merge module 240 and pool addressing module 230 may operate to combine multiple key data elements from multiple files to generate a final key data element by performing the multiple permutation processes on the synchronized TRN pool 210 as described above. In either case, the key data element from the random number merge module 240 can be combined with the combined key data element from the pseudo-random number generator 250 to generate a final key data element for XOR 270.

Figure 6:
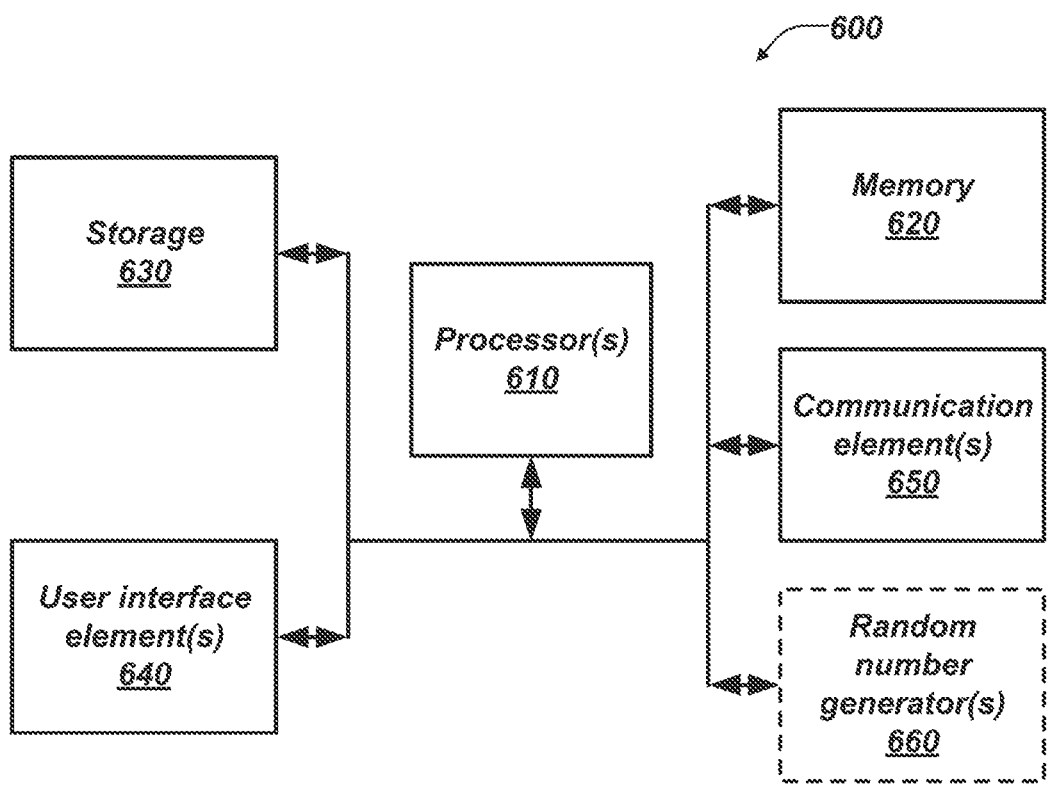
FIG. 6 is a block diagram illustrating a computing system for practicing embodiments of the present disclosure.

FIG. 6 illustrates a computing system 600 for practicing embodiments of the present disclosure. As non-limiting examples, the computing system 600 may be a user-type computer, a file server, a compute server, a notebook computer, a tablet, a handheld device, a mobile device, or other similar computer system for executing software. Computer, computing system, and server may be used interchangeably herein to indicate a system for practicing embodiments of the present disclosure. The computing system 600 is configured for executing software programs containing computing instructions and includes one or more processors 610, memory 620, storage 630, user interface elements 640, and one or more communication elements 650. Some embodiments of the computing system 600 may include one or more random number generators 660 as explained more fully above in connection with FIGS. 1 through 6.

The one or more processors 610 may be configured for executing a wide variety of operating systems and applications including computing instructions for carrying out embodiments of the present disclosure.

The memory 620 may be used to hold computing instructions, data structures, and other information for performing a wide variety of tasks including performing embodiments of the present disclosure. By way of example, and not limitation, the memory 620 may include Synchronous Random Access Memory (SRAM), Dynamic RAM (DRAM), Read-Only Memory (ROM), flash memory, and the like.

The memory 620 may include other types of memory devices, including volatile storage devices or non-volatile storage devices, configured to store information. Examples of other types of memory 620 include nano RAM or (NRAM), nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), magneto-resistive RAM (MRAM), phase change RAM (PCRAM), phase change memory, or other solid-state storage media.

The storage 630 may be used for storing relatively large amounts of non-volatile information for use in the computing system 600 and may be configured as one or more storage devices. By way of example, and not limitation, these storage devices may include computer-readable media (CRM). This CRM may include, but is not limited to, magnetic and optical storage devices such as disk drives, magnetic tapes, optical storage drives such as CDs (compact disks), DVDs (digital versatile discs or digital video discs), and other equivalent storage devices.

Information related to the computing system 600 may be presented to, and received from, a user with one or more user interface elements 640. As non-limiting examples, the user interface elements 640 may include elements such as displays, keyboards, mice, joysticks, haptic devices, microphones, speakers, cameras, and touchscreens. A display on the computing system may be configured to present a graphical user interface (GUI) with information about the embodiments of the present disclosure.

The communication elements 650 may be configured for communicating with other devices or communication networks. As non-limiting examples, the communication elements 650 may include elements for communicating on wired and wireless communication media, such as for example, serial ports, parallel ports, Ethernet connections, universal serial bus (USB) connections IEEE 1394 ("firewire") connections, lightning connections, thunderbolt connections, Bluetooth wireless connections, 802.1 a/b/g/n type wireless connections, cellular phone connections, TCP/IP, FTP, HTTP, and other suitable communication interfaces and protocols.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof.

By way of non-limiting example, computing instructions for performing the processes may be stored on the storage 640, transferred to the memory 620 for execution, and executed by the processors 610. The processors 610, when executing computing instructions configured for performing the processes, constitutes structure for performing the processes and can be considered a special-purpose computer when so configured. In addition, some or all portions of the processes may be performed by hardware specifically configured for carrying out the processes.

Many of the functional units described in this specification may be labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software, stored on a physical storage device 630 (e.g., a computer readable storage medium), in memory 620, or a combination thereof for execution by various types of processors.

An identified module of executable code may, for instance, comprise one or more physical or logical blocks of computer instructions, which may, for instance, be organized as a thread, object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage 630 or memory 620 devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) that can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present disclosure is not so limited. Rather, many additions, deletions, and modifications to the illustrated and described embodiments may be made without departing from the scope of the disclosure as hereinafter claimed along with their legal equivalents. In addition, features from one embodiment may be combined with features of another embodiment while still being encompassed within the scope of the disclosure as contemplated by the inventor.

Additional non-limiting embodiments of the present disclosure include:

A computing system configured for performing cryptographic procedures and comprising one or more memories for storing computing instructions and one or more processors operably coupled to the one or more memories, wherein the computing instructions are configured for performing the operations of any of claims 1-14 below.

What is claimed is:

1. A computer-implemented method for performing cryptographic procedures, comprising:
on a sending device:
storing a first copy of a True Random Number (TRN) pool comprising key data elements of truly random numbers in a pool of individually addressable files;
expanding an apparent size of the TRN pool using a random number merge module to create a randomizing process for selecting and re-using the key data elements from the individually addressable files in the first copy of the TRN pool to produce subsequent key data elements;
combining clear text data elements with the subsequent key data elements using an encryption operation to produce encrypted data elements; and
transmitting the encrypted data elements; and
on a receiving device:
storing a second copy of the TRN pool, wherein the second copy matches the first copy;
expanding an apparent size of the TRN pool on the receiving device using a receiving random number merge module to create the randomizing process for selecting and re-using the key data elements from the individually addressable files in the second copy of the TRN pool to produce receive key data elements, wherein the randomizing process on the receiving device performs the same functions as, and is synchronized with, the randomizing process on the sending device such that the receive key data elements match the subsequent key data elements;
receiving the encrypted data elements; and
combining the receive key data elements with the encrypted data elements using a decryption operation to produce received cleartext elements.

2. The computer-implemented method of claim 1, further comprising:
communicating TRN pool addressing information between the sending device and the receiving device, wherein the TRN pool addressing information includes two or more file identifiers, a starting address for each of the two or more file identifiers, and step size information for each of the two or more file identifiers; and
using the TRN pool addressing information to define a new randomizing process at a predefined upcoming point in the cryptographic procedures, wherein the predefined upcoming point in the cryptographic procedures can be reproduced and synchronized on the sending device and the receiving device.

3. The computer-implemented method of claim 1, wherein the randomizing process on at least one of the sending device and or the randomizing process on the receiving device further comprises:
including a pool addressing module to provide two or more addressing permutations, each of the addressing permutations to address data elements in one of the individually addressable files of the TRN pool by permuting the data elements in the file of the TRN pool in a non-sequential order to produce permuted data elements; and
combining the permuted data elements from each of the two or more addressing permutations with XOR operations to create the subsequent key data elements on the transmit device and the receive key data elements on the receive device.

4. The computer-implemented method of claim 1, wherein the randomizing process on the sending device and the randomizing process on the receiving device each further comprise:
performing a pseudo-random number generation process seeded with one or more initialization parameters to produce a pseudo-random data element at each subsequent state of the process, wherein the pseudo-random number generation process can be reproduced and synchronized on the receiving device when seeded with the one or more initialization parameters;
combining the pseudo-random data elements with the key data elements from the individually addressable files in the TRN pool with an XOR operation to create combined key data elements; and
using the combined key data elements as the subsequent key data elements for the encryption operation on the sending device and as the receive key data elements for the decryption operation on the receiving device.

5. The computer-implemented method of claim 1, wherein:
storing the first copy of the TRN pool and storing the second copy of the TRN pool comprises storing a TRN pool provided by a TRN provider; and
the method further comprises:
modifying the first copy of the TRN pool using at least one user-identified randomization process to produce modified key data elements with a user-specific modification unknown to the TRN provider; and
modifying the second copy of the TRN pool using the at least one user-identified randomization process to produce the modified key data elements with the user-specific modification unknown to the TRN provider.

6. A computing system for performing cryptographic procedures, the computing system comprising:
memory for storing computing instructions; and
a processor operably coupled to the memory and for performing the computing instructions, the computing instructions to:
store a first copy of a True Random Number (TRN) pool in the memory, the TRN pool comprising key data elements of truly random numbers in a pool of individually addressable files, wherein a second copy of the TRN pool is to be stored on a second computing system;
expand an apparent size of the TRN pool using a pool expander to create a randomizing process for selecting and re-using the key data elements from the individually addressable files in the TRN pool to produce further key data elements, wherein the randomizing process is to be performed on the second copy of the TRN pool on the second computing system to align the TRN pool on the computing system with the TRN pool on the second computing system in order to at least one of encrypt or decrypt data elements communicated between the computing system and the second computing system;
combine clear text data elements with the further key data elements using an encryption operation for each clear text data element with each key data element to produce encrypted data elements; and
transmit the encrypted data elements to the second computing system.

7. The computing system of claim 6, wherein the computing instructions are further to:

combine clear text data elements with the further key data elements using an encryption operation for each clear text data element with each key data element to produce encrypted data elements; and transmit the encrypted data elements to the second computing system.

8. The computing system of claim 6, further comprising the second computing system comprising a receiving device including a second memory for storing second computing instructions and a second processor operably coupled to the second memory and for performing the second computing instructions, which are to:

store a second copy of the TRN pool, wherein the second copy matches the first copy;

expand an apparent size of the TRN pool on the receiving device using a receiving random number merge module to create the randomizing process for selecting and re-using the key data elements from the individually addressable files in the second copy of the TRN pool to produce receive key data elements, wherein the randomizing process on the receiving device performs the same functions as, and is synchronized with, the randomizing process on the computing system comprising a sending device such that the receive key data elements match the further key data elements;

receive the encrypted data elements; and combine the receive key data elements with the encrypted data elements using a decryption operation to produce received cleartext elements.

9. The computing system of claim 6, wherein the computing instructions are further to:

receive encrypted data elements from the second computing system; and combine the further key data elements with the encrypted data elements using a decryption operation for each of the encrypted data elements with each of the further key data elements to produce clear text data elements.

10. The computing system of claim 6, wherein the computing instructions are further to:

communicate TRN pool addressing information between the computing system and the second computing system, wherein the TRN pool addressing information includes two or more file identifiers, a starting address for each of the two or more file identifiers, and step size information for each of the two or more file identifiers; and use the TRN pool addressing information to define a new randomizing process at a predefined upcoming point in the cryptographic procedures, wherein the predefined upcoming point in the cryptographic procedures can be reproduced and synchronized on the second computing system.

11. The computing system of claim 6, wherein the computing instructions are further for performing the randomizing process to:

include a pool addressing module to provide two or more addressing permutations, each of the addressing permutations to address data elements in one of the individually addressable files of the TRN pool by permuting the data elements in the file of the TRN pool in a non-sequential order to produce permuted data elements; and combine the permuted data elements from each of the two or more addressing permutations with XOR operations to create the further key data elements.

12. The computing system of claim 11, wherein each of the two or more addressing permutations comprises a stepping process to loop through the file using one or more initialization parameters including a starting address and a step size to generate the non-sequential order by performing a plurality of loops through the file, wherein the step size is modified each time through the loop and all of the key data elements of the selected file are addressed by the stepping process.

13. The computing system of claim 6, wherein the computing instructions are further for performing the randomizing process to:

perform a pseudo-random number generation process seeded with one or more initialization parameters to produce a pseudo-random data element at each subsequent state of the process, wherein the pseudo-random number generation process can be reproduced and synchronized on the second computing system when seeded with the one or more initialization parameters;

combine the pseudo-random data elements with the key data elements from the individually addressable files in the TRN pool with an XOR operation to create combined key data elements; and use the combined key data elements as final key data elements for the encryption operation.

14. The computing system of claim 6, wherein the computing instructions are further to:

store the first copy of the TRN pool as a TRN pool received from a TRN provide rand wherein the second copy of the TRN pool is also provided by the TRN provider; and modify the first copy of the TRN pool using at least one user-identified randomization process to produce modified key data elements with a user-specific modification unknown to the TRN provider, wherein the at least one user-identified randomization process is configured such that it can be performed on the second copy of the TRN pool on the second computing system.

15. The computing system of claim 6, wherein the pool expander defines a substantially random method of using the key data elements of the truly random numbers in the TRN pool multiple times before the key data elements of the truly random numbers are retired from use.

16. A computing system for performing cryptographic procedures, comprising:

a sending device including a first memory for storing first computing instructions and a first processor operably coupled to the first memory and for performing the first computing instructions, which are to:

store a first copy of a True Random Number (TRN) pool comprising key data elements of truly random numbers in a pool of individually addressable files;

expand an apparent size of the TRN pool using a random number merge module to create a randomizing process for selecting and re-using the key data elements from the individually addressable files in the first copy of the TRN pool to produce final key data elements;

combine clear text data elements with the final key data elements using an encryption operation to produce encrypted data elements; and transmit the encrypted data elements;

a receiving device including a second memory for storing second computing instructions and a second processor operably coupled to the second memory and for performing the second computing instructions, which are to:

store a second copy of the TRN pool, wherein the second copy matches the first copy;

expand an apparent size of the TRN pool on the receiving device using a receiving random number merge module to create the randomizing process for selecting and re-using the key data elements from the individually addressable files in the second copy of the TRN pool to produce receive key data elements, wherein the randomizing process on the receiving device performs the same functions as, and is synchronized with, the randomizing process on the sending device such that the receive key data elements match the final key data elements;

receive the encrypted data elements; and combine the receive key data elements with the encrypted data elements using a decryption operation to produce received cleartext elements.

17. The computing system of claim 16, wherein the computing instructions are further to:

communicate TRN pool addressing information between the sending device and the receiving device, wherein the TRN pool addressing information includes two or more file identifiers, a starting address for each of the two or more file identifiers, and step size information for each of the two or more file identifiers; and use the TRN pool addressing information to define a new randomizing process at a predefined upcoming point in the cryptographic procedures, wherein the predefined upcoming point in the cryptographic procedures can be reproduced and synchronized on the sending device and the receiving device.

18. The computing system of claim 16, wherein:

the first computing instructions on the sending device are further for performing the randomizing process to:

provide two or more addressing permutations, each of the addressing permutations to address data elements in one of the individually addressable files of the first copy of the TRN pool by permuting the data elements in the files in a non-sequential order to produce permuted data elements; and combine the permuted data elements from each of the two or more addressing permutations with XOR operations to create the final key data elements on the transmit device; and the second computing instructions on the receiving device are further for performing the randomizing process to:

provide two or more addressing permutations, each of the addressing permutations to address data elements in one of the individually addressable files of the second copy of the TRN pool by permuting the data elements in the files in a non-sequential order to produce permuted data elements; and combine the permuted data elements from each of the two or more addressing permutations with XOR operations to create receive key data elements on the receive device.

19. The computing system of claim 16, wherein the first computing instructions on the sending device and the second computing instructions on the receiving device are each further to:

perform a pseudo-random number generation process seeded with one or more initialization parameters to produce a pseudo-random data element at each subsequent state of the process, wherein the pseudo-random number generation process can be reproduced and synchronized on the receiving device when seeded with the one or more initialization parameters;

combine the pseudo-random data elements with the key data elements from the individually addressable files in the TRN pool with an XOR operation to create combined key data elements; and use the combined key data elements as the final key data elements for the encryption operation on the sending device and as the receive key data elements for the decryption operation on the receiving device.

20. The computing system of claim 16, wherein:

the first computing instructions on the sending device are each further to:

receive the first copy of the TRN pool from a TRN provider; and modify the first copy of the TRN pool using at least one user-identified randomization process to produce modified key data elements for the first copy of the TRN pool with a user-specific modification unknown to the TRN provider; and the second computing instructions on the receiving device are each further to:

receive the second copy of the TRN pool from the TRN provider; and modify the second copy of the TRN pool using the at least one user-identified randomization process to produce the modified key data elements for the second copy of the TRN pool with the user-specific modification unknown to the TRN provider.

* * * * *